United States Patent

[11] 3,603,690

| [72] | Inventor | Thomas M. Hard |
| | | Cambridge, Mass. |
| [21] | Appl. No. | 868,445 |
| [22] | Filed | Oct. 22, 1969 |
| [45] | Patented | Sept. 7, 1971 |
| [73] | Assignee | The United States of America as represented by the Administrator of the National Aeronautics and Space Administration |

[54] OPTICAL SYSTEMS HAVING SPATIALLY INVARIANT OUTPUTS
13 Claims, 23 Drawing Figs.

[52] U.S. Cl. .................................................. 356/113,
350/162, 356/209, 356/244
[51] Int. Cl. .................................................. G01b 9/02,
G01b 21/48, G01n 21/16
[50] Field of Search........................................... 350/162;
356/74, 101, 106, 113, 209, 212, 244; 331/94.5

[56] References Cited
UNITED STATES PATENTS
| 3,069,966 | 12/1962 | White.............................. | 356/100 |
| 3,069,967 | 12/1962 | White et al. ................... | 356/100 |
| 3,448,404 | 6/1969 | McFarlane..................... | 331/94.5 |

FOREIGN PATENTS
| 984,590 | 2/1965 | Great Britain................ | 331/94.5 |

*Primary Examiner*—William L. Sikes
*Assistant Examiner*—V. P. McGraw
*Attorneys*—Herbert E. Farmer, John R. Manning and Garland T. McCoy ABSTRACT: This disclosure describes optical systems that have output beams that are spatially invariant to the angle of incidence upon a certain rotatable surface forming a part of the systems, and can be used to select the wavelength of the output of an optical source, such as a laser cavity, or to aid in measuring the reflectance of a material in reflectance spectroscopy. The optical systems comprise various combinations of plane mirrors and plane diffraction gratings (or sample surfaces), in some embodiments, spherical mirrors. The plane mirrors, plane gratings and spherical mirrors are either rotated or fixed in space in accordance with a particular embodiment. The moveable suitable movement mechanism, such as a micrometer. By rotating the shaft of the micrometer to a particular incidence angle, the frequency of the output of a laser cavity can be selected. Alternately, the reflectance of a material can be observed for a particular angle. In either case, the output beam remains spatially invariant as the position of the shaft and its attached elements is changed.

INVENTOR
THOMAS M. HARD

INVENTOR
THOMAS M. HARD

INVENTOR
THOMAS M. HARD

INVENTOR
THOMAS M. HARD

INVENTOR
THOMAS M. HARD

3,603,690

OPTICAL SYSTEMS HAVING SPATIALLY INVARIANT OUTPUTS

ORIGIN OF THE INVENTION

This invention was made by an employee of the United States Government and may be manufactured and used by or for the Government for governmental purposes without the payment of any royalties thereon or therefor.

BACKGROUND OF THE INVENTION

This invention relates to optical systems and more particularly to optical systems that given a fixed input beam, have an output beam that is invariant to the angle of incidence upon a certain rotatable plane surface forming a part of the system. As hereinafter used, the term "spatially invariant" refers to this property.

Various types of optical systems have been developed for selecting the wavelength of the output from a multiple wavelength optical source. The optical source may be multiple wavelength laser, for example. More specifically, a carbon dioxide laser may generate light waves at 50 or more different wavelengths. Hence, it is desirable to provide an apparatus for selecting a light beam at any one of these wavelengths, as desired. It is particularly desirable to provide a wavelength selection apparatus that has a spatially invariant output beam when the wavelength selected is changed from one wavelength to another wavelength.

Among the prior art wavelength selective optical systems are devices that make use of angle doubling or halving mechanisms. Others make use of parallelogram linkages. In general, the prior art devices have one common disadvantage. Specifically, they require fabrication to close mechanical tolerances. In addition, they often require more than a minimum number of optical components. Hence, it is not only desirable to provide a system for selecting a light beam having a particular wavelength from a multiple wavelength light source, it is also desirable to provide such a system that it is uncomplicated and easy to fabricate, thereby making it inexpensive to manufacture and use.

Therefore, it is an object of this invention to provide a new and improved optical system.

It is a further object of this invention to provide a new and improved optical system that can select a particular wavelength light beam from a multiple wavelength light source.

It is yet another object of this invention to provide an apparatus that is uncomplicated and suitable for selecting a particular wavelength light beam from a plural wavelength light source and generating an output beam that is spatially invariant regardless of the wavelength selected.

While the invention is primarily intended for use with multiple wavelength lasers, it will be appreciated from the following description that it can be utilized with other light sources. In addition, the invention can be utilized in reflectance spectroscopy to vary the angle of incidence of the impinging beam. Moreover, the invention can be utilized to scan the multiple wavelength output of a laser or other optical source. In all cases the output beam is spatially invariant.

SUMMARY OF THE INVENTION

In accordance with a principle of this invention, optical systems suitable for selecting a particular wavelength output from a multiple wavelength optical source are provided. In general, these systems comprise various combinations of a plane grating, and one or more plane mirrors, and, in some embodiments, one or more spherical mirrors. The plane mirrors and the plane grating have planes that either intersect directly to define a common axis, or are coplanar. The center of curvature of one of the spherical mirrors coincides with this axis. The plane grating and at least one of the plane mirrors are rotatable (moveable through an arc) to provide wavelength selection.

In accordance with another principle of this invention, a single plane mirror and the plane grating are in a common plane and are mounted on arms attached to the shaft of a suitable movement mechanism such as a micrometer. In addition, the plane grating forms the end reflector of a multiple wavelength laser. When the shaft of the micrometer is rotated through a small arc, frequency selection is provided by the plane grating. A single spherical mirror fixed in space is included in this system to reflect the selected light beam from the plane grating to the plane mirror, so that the output from the overall system is spatially invariant.

In accordance with an alternate principle of this invention, the single-spherical mirror is attached to the shaft of the micrometer and moves as the plane mirror and the plane grating move.

In accordance with a further principle of this invention, a thin beam splitter is substituted for the plane mirror and plane grating, and a second spherical mirror is mounted on the other side of the plane grating and plane mirror from the first spherical mirror in a "mirror" position whereby an interferometer is formed.

In accordance with other principles of this invention, the output beam is focused or collimated with a greater diameter than the beam generated by the laser. In addition, additional mirrors are provided for passing the selective wavelength along a preselected axis, as desired.

In accordance with yet another principle of this invention, the plane grating and plane mirrors are longitudinally arrayed along a common axis and preselected mirrors and the grating are rotated about the axis. Moreover, a sample surface can be substituted for the plane grating thereby allowing the invention to be used in reflectance spectroscopy.

It will be appreciated from the foregoing brief summary of the invention that a system for selecting a particular wavelength from a plurality of discrete wavelengths generated by a suitable optical medium such as a multifrequency laser is provided. The system is uncomplicated in that it merely requires a combination of plane mirrors, plane gratings and spherical mirrors to provide the desired wavelength selection. In addition, because the output is spatially invariant, suitable output sensing means can be mounted in a fixed position, which position does not have to be changed for each wavelength change. In addition, the invention is versatile because by using a thin beamsplitter in place of the plane grating and plane mirror, a simple interferometer is formed. Finally, if desired the output from the active medium or laser can be either focused or collimated across a larger diameter by the addition of suitable reflective elements.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

Figure 1:
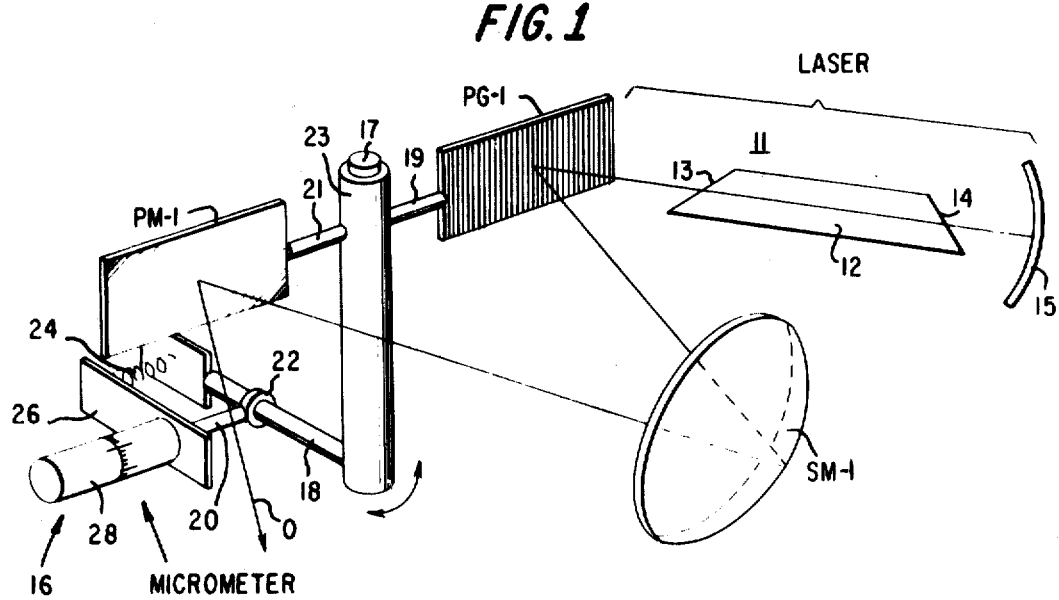
FIG. 1 is a pictorial view of one embodiment of the invention.

The embodiment of the invention illustrated in FIG. 1 includes a laser 11. The laser 11 is formed of a tube 12 having Brewster angled end windows 13 and 14 and containing an active medium such as gaseous $CO_2$, for example, excited by an electric discharge. A spherical mirror 15 is located at one end of the tube and a plane diffraction grating, designated PG-2 is located at the other end so that a laser resonator is formed. PG-1 therefore forms a portion of the laser. In addition, as hereinafter described, PG-1 forms a portion of the invention.

The invention also includes a micrometer 16 attached to a rotatable shaft 17 having a pair of axially aligned outwardly extending arms 19 and 21. The attachment mechanism comprises an arm 18 attached to the rotatable shaft 17 at some point along the length of the shaft. The moveable element 20 of the micrometer 16 is attached to the arm in any suitable manner, such as by passing through the arm and fixedly held by a collar 22. A spring 24 is mounted between the outer end of the arm 18 and a second collar 26 fixedly attached to the housing 28 of the micrometer 16. As the micrometer 16 is operated in a conventional manner the moveable element 30 moves inwardly and outwardly, thereby moving the arm 18 and rotating the shaft 17.

PG-1 is attached to one of the outwardly extending arms 19. A plane mirror designated PM-1 is attached to the other outwardly extending arm 21. A spherical mirror designated SM-1 is fixedly mounted so that it intersects a selected wavelength light beam reflected from PG-1 and reflects it to PM-1. The output from PM-1 is projected along a line designated 0 and is spatially invariant. That is, as the shaft 17 moves due to the action of the micrometer 16, PG-1 and PM-1 are rotated and wavelength selection occurs. However, regardless of the selected wavelength the output beam remains spatially invariant along line 0.

Turning to a more complete description of the operation of the embodiment of the invention illustrated in FIG. 1, PG-1 and PM-1 lie in the same plane and are rotated by the micrometer 15 about an axis lying in that plane, which axis is perpendicular to the plane of incidence of the laser beam. In addition, the center of curvature of SM-1 is at the point of intersection of the rotation axis with the plane of incidence. Hence, as the plane of PG-1 and PM-1 rotates or moves through an arc, an illuminated spot moves across SM-1 at twice the angular rate of movement of this plane. In addition, because the principle axis of the laser does not change, (only the angle of incidence on PG-1, changes) the output along line 0 remains spatially invariant.

Figure 2:
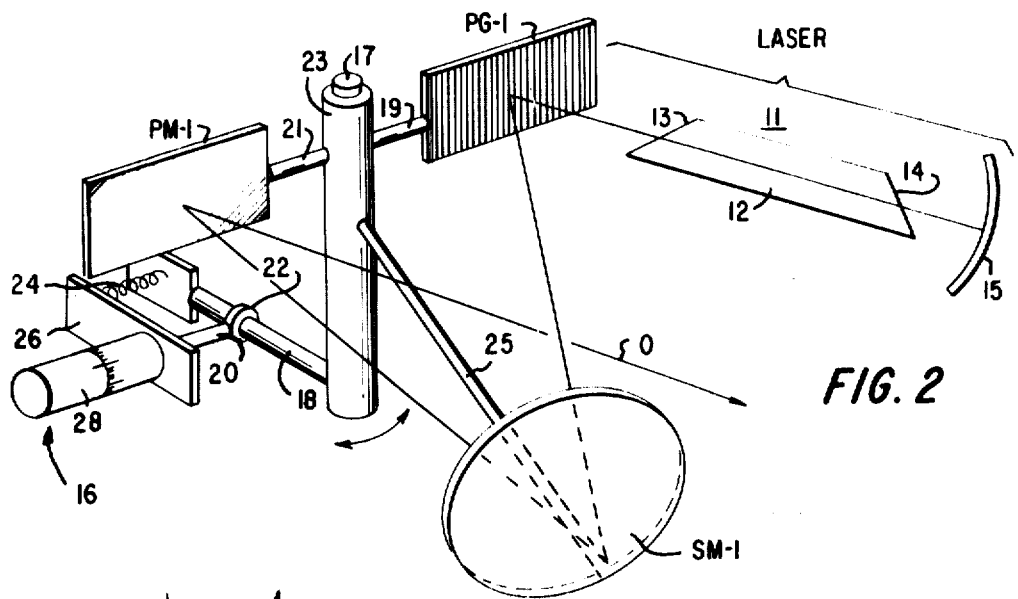
FIG. 2 is a pictorial view of an alternate embodiment of the invention.

While SM-1 is illustrated in FIG. 1 as being fixed in space, it can be attached by a suitable arm 25 to the rotating assembly, as illustrated in FIG. 2 to form an alternate embodiment of the invention. In addition, SM-1 may either lie between (FIG. 1) or to one side of (FIG. 2) the entering and departing beams. A particular configuration only fails to work when SM-1 intersects the entering or departing beams, or when any of the reflecting surfaces fails to intersect its intended beam.

Figure 3:
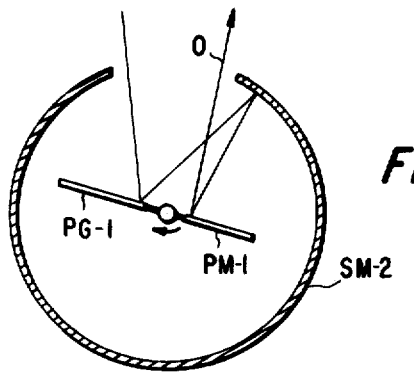
FIG. 3 is a schematic view of another alternate embodiment of the invention.

FIG. 3 illustrates a modification of the embodiment of the invention illustrated in FIG. 2. In the FIG. 3 embodiment SM-1 is replaced by a different sized spherical mirror designated SM-2. SM-2 is a large spherical mirror which is designed to cover the full range of positive and negative angles of incidence, with the exception of a short interval near normal incidence and a short interval near grazing incidence. However, the center of curvature of SM-2 is the same as the center of curvature of SM-1, i.e., it coincides with the intersection of the rotation axis and the plane of incidence.

Figure 4:
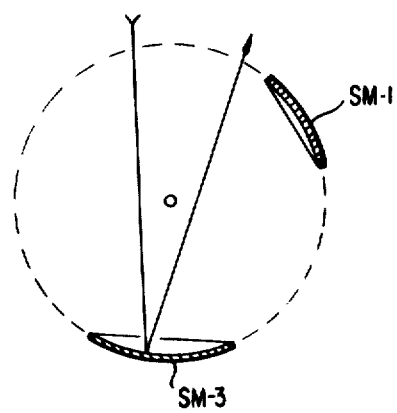
FIG. 4 is a schematic view used to describe some of the embodiments of the invention.

As illustrated in FIG. 4, the focal properties of the embodiments of the invention illustrated in FIGS. 1–3 are equivalent to the replacement of PG-1, PM-1 and SM-1 with a spherical mirror designated SM-3 that intersects the input beam at a point where it would normally intersect the sphere defined by the radius of the spherical mirror SM-1 if extended along the dotted circle as illustrated in FIG. 3. Hence, the inventive structure may be inserted in any optical system as a replacement for a fixed spherical mirror, such as SM-3 which contains no obstructions inside its extended sphere. The invention may then be used to provide wavelength selection.

Figure 5:
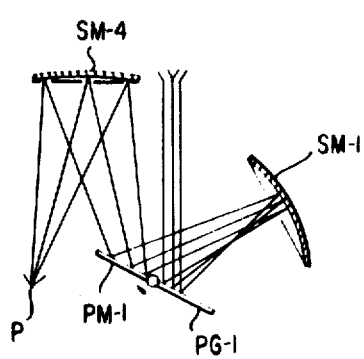
FIG. 5 is a schematic view of an embodiment of the invention wherein the output is focused at a particular point.
Figure 6:
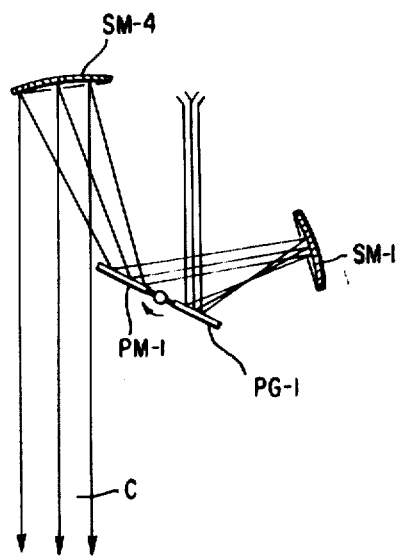
FIG. 6 is a still further embodiment of the invention wherein the output beam is collimated.

FIG. 5 and 6 illustrate laser wavelength selection and output coupling applications of the embodiments of the invention illustrated in FIGS. 1 and 2. However, prior to describing those FIGURES, it should be noted that: the grating grooves, illustrated in FIGS. 1 and 2, are perpendicular to the plane of incidence of the laser; the operating wavelength, $\lambda$, of the laser cavity is determined by the grating equation:

$n\lambda = 2d \sin \theta$ $\lambda$ = the operating wavelength
$n$ = order of diffraction
$d$ = grating groove spacing
$\theta$ = angle of incidence measured from grating normal; and, the output is extracted from the zeroth order reflection of the grating.

It will be appreciated by those skilled in the art and others that the embodiments of the invention illustrated in FIGS. 1–3 are well suited to use in environments where it is desired to bring the laser output beam to a point of focus (FIG. 5). In addition these embodiments can be used to produce a collimated beam having a diameter larger than that of the original laser beam (FIG. 6). More specifically, either of these desired outputs are achieved by intersecting the output from PM-1 with a suitable second spherical mirror designated SM-4. In FIG. 5, the location and radius of curvature of SM-4 are chosen so as to bring the output to a point of focus at P. In FIG. 6 the location and radius of curvature of SM-4 are chosen so that the output is collimated at C.

Figure 7:
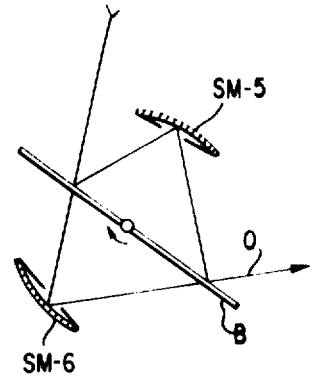
FIG. 7 is a schematic view of an embodiment of the invention in the form of an interferometer.

The length of the optical path of a ray in the embodiments of the invention illustrated in FIGS. 1–3 is invariant to the rotation of the three optical components, PM-1, PG-1 and SM-1 (or SM-3). In addition, it is equal in length to the virtual optical path illustrated in FIG. 4. Thus, as illustrated in FIG. 7, the replacement of PM-1 and PG-1 by a thin, partially transmitting, partially reflecting beamsplitter forms a basis for a simple interferometer. The relative intensities of the two beams may be adjusted by rotation of the beamsplitter about the common axis which is defined by the center of curvature of the spherical mirrors and the plane of the beamsplitter.

More specifically, FIG. 7 illustrates a thin, partially transmitting, partially reflecting beamsplitter designated B which replaces PM-1 and PG-1. Located on either side of B are spherical reflecting mirrors SM-5 and SM-6. SM-5 and SM-6 are mounted so that they intersect the partially transmitted and partially reflected rays, respectively, and reflect them back to the beamsplitter B to provide interferometer action at the point of reintersection with B. As with the previously described embodiments, the centers of curvature of SM-5 and SM-6 are at a point which point lies on the axis of rotation of the thin, partially transmitting, partially reflecting beamsplitter B.

It will be appreciated by those skilled in the art and others, from the foregoing description, that FIGS. 1-3 illustrate slight variations of a basic configuration of the invention. FIGS. 5-7 illustrate uses of the basic structures illustrated in FIGS. 1-3 and FIG. 4 illustrates the virtual effect of these basic structural configurations. It will also be appreciated that these embodiments of the invention provide a rather uncomplicated system for selecting the output of a multiple wavelength laser. That is, by slightly varying the angle of incidence of the laser beam on a diffraction grating wavelength selection is provided. In addition, wavelength scanning of the laser beam is provided by continuously rotating the diffraction grating and the plane mirror through a predetermined angle. Because the output from these embodiments of the invention is spatially invariant, a suitable detector can be mounted in a fixed position. Moreover, the output can be focused or collimated as illustrated in FIGS. 5 and 6, as desired. In addition, the basic structure can be used to provide a simple interferometer.

It should be noted that the common criteria of the embodiments of the invention previously described, and illustrated in FIGS. 1-7 is that they all comprise a plane grating and a plane mirror (or a thin beamsplitter) mounted in a common plane in combination with one or more spherical mirrors. The following described embodiments of the invention vary from this basic criterion even though there are still common similarities between those embodiments and the previously described embodiments. Specifically, the embodiments illustrated in FIGS. 8-17 and hereinafter described utilize only a plane grating and a plane mirror, or more than one plane mirror. However, no spherical mirrors are used. Contrawise, the embodiments illustrated in FIGS. 18-23 utilize plane mirrors, plane gratings and spherical mirrors, rotated about a different axis.

Figure 8:
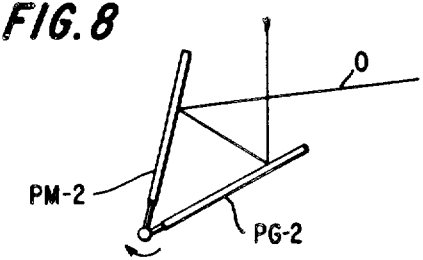
FIGS. 8, 9, 10, 11, 12, and 13 illustrate embodiments of the invention utilizing only a single-plane mirror and a single grating to provide wavelength selection along a predetermined output path.

FIG. 8 illustrates a plane grating designated PG-2 mounted so as to intersect the beam generated by a suitable optical source (not shown). FIG. 8 also illustrates a plane mirror designated PM-2. PM-2 defines a plane that intersects the plane defined by PG-2 along a line perpendicular to the plane of incidence. If desired, the location of PM-2 and PG-2 can be interchanged. By attaching PM-2 and PG-2 to the arms of a micrometer or other suitable rotating assembly in the manner illustrated in FIGS. 1 and 2 and rotating the assembly about the line of intersection, the beam departing after the second reflection is along a line 0 and is fixed in space. Alternatively, if the assembly is rotated about some other axis perpendicular to the plane of incidence, but not the line of intersection, the departing beam remains fixed in direction while translating laterally. By viewing FIGS. 8-12 the following is observed: (1) FIG. 8 provides a delta-shaped ray path; (2) FIGS. 9 and 10 provide a Z-shaped ray path; and, (3) FIGS. 11 and 12 provide a U-shaped ray path.

Figure 9:
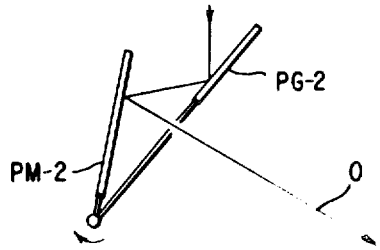
Figure 10:
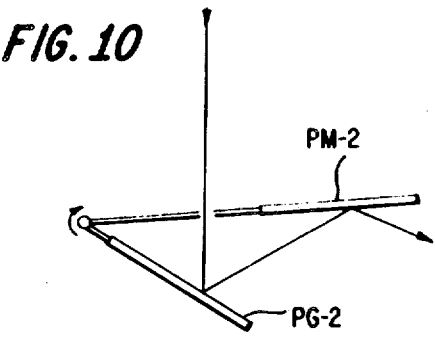
Figure 11:
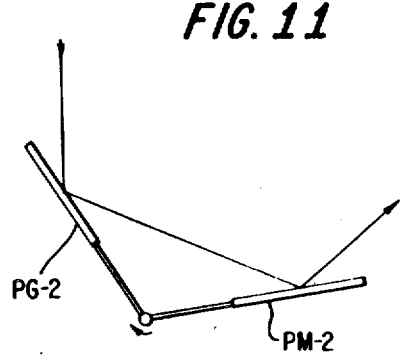
Figure 12:
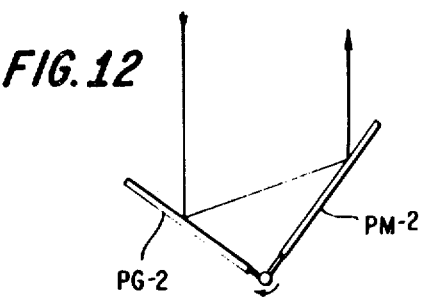

The angle of plane intersection defined by PG-2 and PM-2 is acute in FIGS. 8-10 and obtuse in FIG. 11. In FIG. 12, the angle is 90°. Hence, the assembly of FIG. 12 might, to some extent, be considered a variation of the "corner mirror" or retroreflector of the prior art. However, it will be appreciated that this invention goes beyond the corner reflector of the prior art. More specifically, the invention provides corner mirror-type reflectors having a diffraction grating in place of one of the mirrors with the grating grooves perpendicular to the plane of incidence to provide a laser end reflector, wavelength selector and output coupler whose output beam is space-invariant to the selected wavelength.

It should be noted that the embodiments of the invention illustrated in FIGS. 8-12 utilize a minimal number of reflectors and no focusing elements which makes them particularly useful inside and outside laser resonators. As previously stated, by making PG-2 a suitable diffraction grating, and mounting it so that it forms a wavelength selective plane end reflector in a laser cavity, a portion of the laser radiation will leave the laser cavity through the zeroth-order (specular) reflection. This output beam will exit as a spatially invariant beam with the selected wavelength being determined by rotation of the grating to a particular angle.

It should be also noted that without PM-2, the output beam will change direction with wavelength. Further, if PG-2, and PM-2 are not rotated about the intersection of their planes, the output beam will translate laterally. Hence, both PG-2 and PM-2 and an appropriate rotation mechanism, are necessary to provide a space invariant output beam with wavelength selection.

Figure 13:
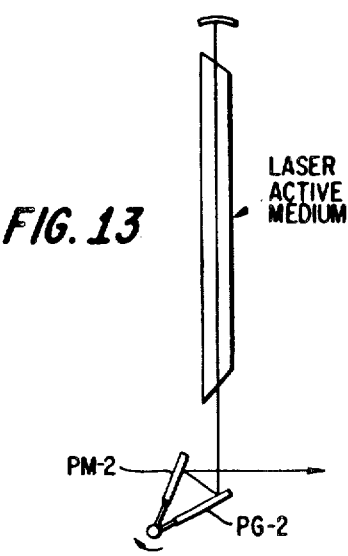
Figure 14:
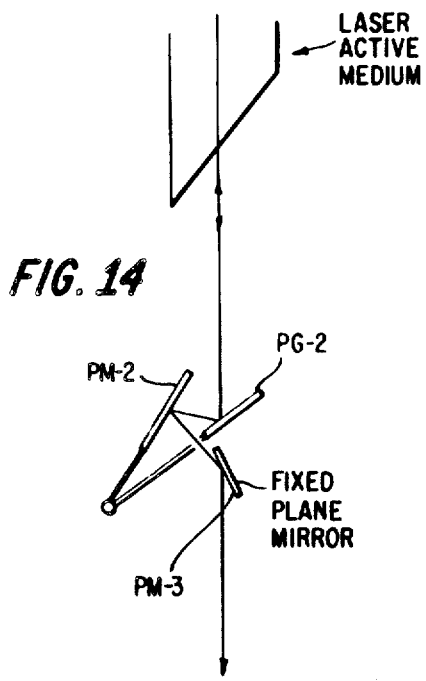
FIG. 14 illustrates an embodiment of the invention wherein the addition of a third fixed plane mirror allows the selected output wavelength of an optical source to be projected along the same axis as the axis of the original optical beam.

As illustrated in FIG. 13, the output beam can couple the laser to its exterior by, utilizing the PM-2 and PG-2 configuration illustrated in FIG. 8, for example. Alternatively, in some environments, it is desirable to direct the output beam along the same as the axis of the laser. FIG. 14 illustrates the utilization of the rotatable PG-2 and PM-2 configuration of FIG. 9 in combination with a third plane mirror designated PM-3 fixedly mounted so as to intersect the output from the FIG. 9 configuration after that configuration selects the desired wavelength. As previously stated, PM-3 is mounted so that its reflected output is along the axis of the laser. By utilizing two or three fixed plane mirrors, collinearity of input and output beams can be also achieved for the other embodiments, i.e., FIGS. 8, 10, 11 and 12.

Figure 15:
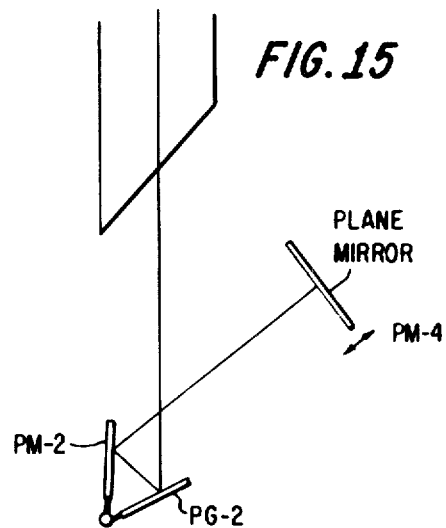
FIG. 15 illustrates an embodiment of the invention wherein the output beam is reflected back into a laser cavity.

In other environments, it may be desirable to mount a fixed plane mirror normal to the output beam so as to return it to the laser cavity. This configuration is illustrated in FIG. 15. In FIG. 15, a third plane mirror designated PM-4 intersects at a right angle the output beam from PM-2 and PG-2 mounted in a FIG. 8 configuration. While the FIG. 8 configuration is being utilized in the FIG. 15 embodiment, it is to be understood that other configurations can also be utilized. It will be appreciated by those skilled in the art that the purpose of returning the output beam to the laser cavity is to reduce the optical loss suffered by the insertion of a wavelength selective grating into the laser cavity. Precise translation of external mirror PM-4 normal to the output beam will contribute additional wavelength and mode-selective properties to the overall system.

Figure 16:
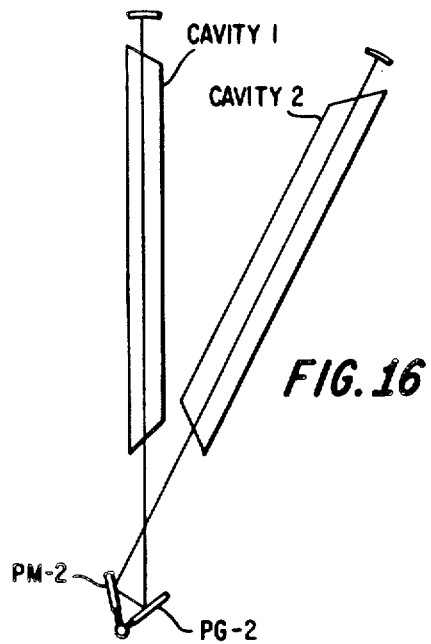
FIG. 16 illustrates an embodiment of the invention wherein the two laser cavities are coupled together.

In addition to returning the beam to the laser cavity, the embodiments of the invention illustrated in FIGS. 8-12 can be utilized to couple two active laser cavities with the same grating. Such a system is illustrated in FIG. 16. FIG. 16 illustrates a first cavity (cavity one) mounted along the axis of the input beam, as previously illustrated, and a second cavity (cavity two) mounted collinear with the axis of the output beam, previously described as line 0. When cavity two is aligned with the specular reflection from cavity one, then the grating equation is automatically satisfied for the same wavelength in each cavity and remains so when PG-2 and PM-2 are rotated as specified previously to vary the wavelength. The coupling of each cavity into the other is determined by the zeroth-order reflection efficiency of the grating.

Figure 17:
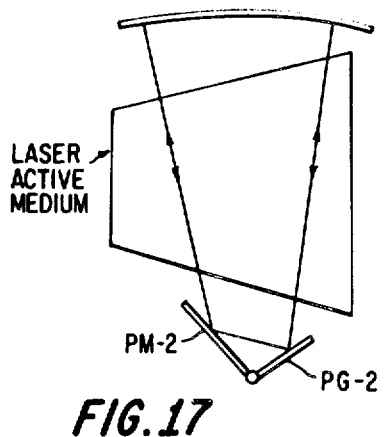
FIG. 17 illustrates a further embodiment of the invention wherein two laser cavities utilize the same spherical reflector.

FIG. 17 illustrates a further utilization of the invention where two cavities share the same spherical reflector designated SM-6. More specifically by mounting SM-6 on one side of a laser active medium and an embodiment of the invention of the type illustrated in either FIG. 11 or FIG. 12 on the other side of the laser active medium, the same cavities will-share the same spherical reflector. The angle between the grating and the plane mirror need not be 90°; however, if it is, the system becomes a single-cavity structure with low loss wavelength selection.

In all of the previously described embodiments of the invention, the incident beam strikes either the plane mirror or the plane grating at some distance from the axis of rotation of these elements. Because of this intersection, the beam "walks" across the surface as the assembly is rotated. While this is no inconvenience in laser wavelength selection usage, it is undesirable when the invention is used for other purposes. For example, in reflectance spectroscopy, the amount of sample material used should be at a minimum, however, a walking beam requires more than a minimum amount. The following described embodiments of the invention are structures wherein the input beam strikes essentially the axis of rotation and, hence, are adapted to eliminate this problem.

Figure 18:
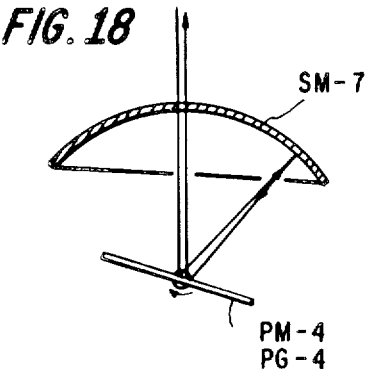
FIG. 18 illustrates a system wherein the point of beam impingement on a plane surface does not change.
Figure 19:
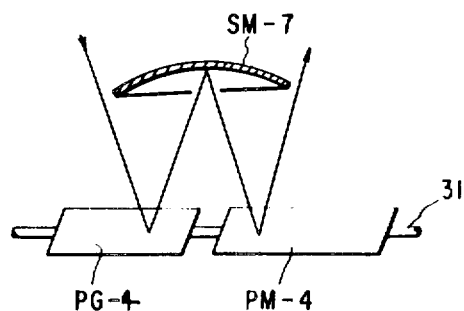
FIG. 19 is a side view of FIG. 18.

FIG. 18 is a top view and FIG. 19 is a side view of an embodiment of the invention that utilizes the same number and type of elements used in the FIGS. 1-3 embodiments. The main difference between the prior embodiments and this embodiment is that the axis of rotation lies on the line joining the point of incidence on the plane grating and the point of incidence on the plane mirror. And, the center of curvature of the spherical mirror, lies in the plane of the plane grating and the plane mirror. More specifically, FIGS. 18 and 19 illustrate a spherical mirror designated SM-7, a plane mirror designated PM-4 and a plane grating designated PG-4. PG-4 and PM-4 lie in the same plane and are attached to a suitable shaft 31 which may be the shaft of a micrometer of the type illustrated in FIGS. 1 and 2.

As the shaft rotates, PG-4 and PM-4 move through a predetermined arc to provide wavelength selection. The incoming beam from the optical source impinges on PG-4 along the axis of rotation. This incident beam is reflected by PG-4 to SM-7 and SM-7 reflects the beam to PM-4. PM-4 then reflects the beam along an output line designated 0. The point of intersection of the beam on PM-4 is also on the axis of rotation. As PG-4 and PM-4 are rotated about the axis, an illuminated spot moves across SM-7 at twice the angular rate of rotation. The spot moves at right angles to the direction of motion of the corresponding spot in the embodiments of the invention illustrated in FIGS. 1-3.

It should be noted that all of the previously described embodiments of the invention have a plane of incidence at all reflecting surfaces that is coplanar and fixed, while in the FIGS. 18 and 19 structure, they are noncoplanar and rotating. As in the FIGS. 1-3 embodiments of the invention, SM-7 may be either fixed in space or attached to the rotating assembly, as desired. The focal properties of the elements illustrated in FIGS. 18 and 19 are the same as the elements described with respect to the FIGS. 1-3 embodiments In addition, PM-4 and PG-4 can be interchanged, if desired.

It also should be noted that the foregoing discussion of the FIGS. 18 and 19 embodiment applied to specular reflectance. However, diffuse reflectance may also be observed by maintaining the same line of observation while rotating PG-4 of PM-4 with respect to the other about the axis previously defined.

Figure 20:
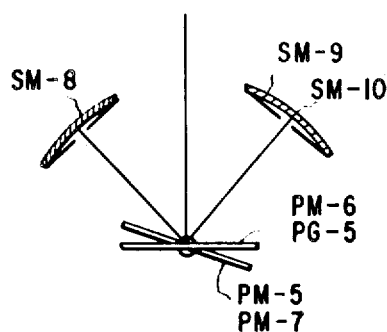
FIG. 20 illustrates a further alternate embodiment of the invention utilizing a plurality of spherical mirrors, a plane grating and a plurality of plane mirrors.
Figure 21:
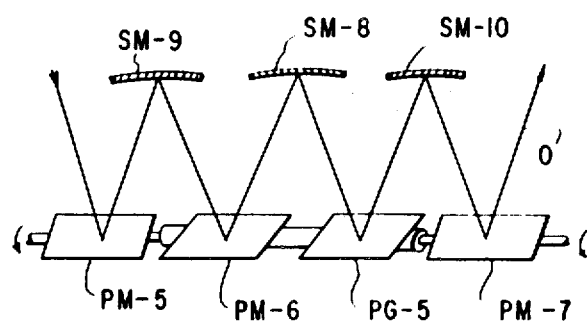
FIG. 21 is a side view of FIG. 20.

FIGS. 20 and 21 illustrate a further alternative embodiment of the invention that includes three spherical mirrors designated SM-8, SM-9 and SM-10, three plane mirrors designated PM-5, PM-6, and PM-7, and a plane diffraction grating designated PG-5. PM-6 and PG-5 are coplanar, as are PM-5 and PM-7. PM-6 and PG-5 are fixedly mounted while PM-5 and PM-7 are rotatable about the hereinafter defined axis. The plane of PM-5 and PM-7 is at an angle with respect to the plane of PM-6 and PG-5. The angle is variable because PM-5 and PM-7 are rotatable with respect to PM-6 and PG-5. A common axis passes through PM-5 and PM-7, and PM-6 and PG-5. It should be noted that the location of PM-6 and PG-5 illustrated in FIG. 21 can be interchanged. SM-8, SM-9 and SM-10 all lie on the same side of PM-5, PM-6, PM-7 and PG-5 and have centers of curvature that lie on the common axis.

The incident light beam strikes PM-5 and is reflected by PM-5 to SM-9 which is mounted so as to reflect the beam to PM-6. PM-6 reflects the beam to SM-8 which is mounted so as to reflect the beam to PG-5. The beam is reflected by PG-5 to SM-10 which is mounted so as to reflect the beam to PM-7. PM-7 reflects the beam along the output line 0. As previously stated, PM-5 and PM-7 are separately coplanar with respect to PM-6 and PG-5 and are rotated together about the common axis which contains the points of incidence in all four plane surfaces. This axis is also the center of curvatures of SM-8, SM-9 and SM-10. As with the embodiment of the invention illustrated in FIGS. 18 and 19, the embodiment of the invention illustrated in FIGS. 20 and 21 can be utilized to obtain diffuse reflectance by rotating PM-5 and PM-7 with respect to each other. This embodiment as well as the last described embodiment, has a spatially invariant output beam along line 0.

Figure 22:
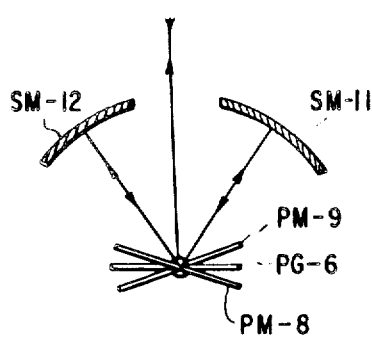
FIG. 22 illustrates yet another embodiment of the invention that utilizes a plurality of plane mirrors, a plane grating and a plurality of spherical mirrors; and, FIG. 23 is a side view of FIG. 22.
Figure 23:
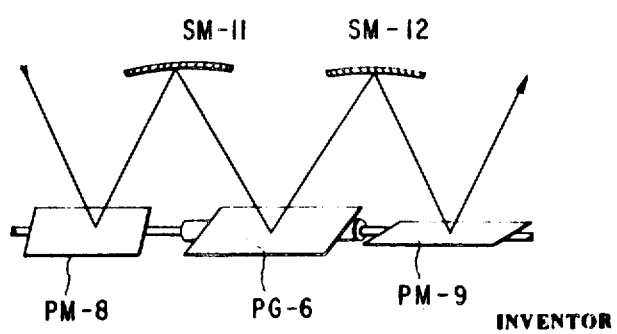

FIGS. 22 and 23 illustrate a still further embodiment of the invention which performs all of the functions of the embodiment of the invention illustrated in FIGS. 20 and 21, however, with one less spherical mirror and one less plane mirror. The embodiment of the invention illustrated in FIGS. 22 and 23 includes two spherical mirrors designated SM-11 and SM-12. In addition, two plane mirrors designated PM-8 and PM-9 are illustrated. Finally, a plane diffraction grating designated PG-6 is illustrated. PM-8, PM-9 and PG-6 all lie in different planes. The plane of PG-6 is fixed in space and the planes of PM-8 and PM-9 are located one on one side and the other on the other side of PG-6 along a common axis. PM-8 and PM-9 are rotated independently. The points of incidence on PM-8, PM-9 and PG-6 as well as the center of curvatures of SM-11 and SM-12 all fall on the common axis. The angles of incidence are varied by the rotation of PM-8 while the angles of observance are varied by the rotation of PM-9. To observe spectroreflectance, it is necessary to replace PG-6 with a sample surface and rotate PM-8 in one direction and PM-9 in the other direction.

It should be noted that the last two described embodiments of the invention provide a plane grating which can be replaced by a sample surface. This surface is fixed in space which aids the measurement of the reflectance of a horizontal bed of loose crystalline powders or an inaccessible surface in a vacuum system, oven or cryostat. It should also be noted that the grating of any of the embodiments can be replaced by a sample surface, however, the last three described embodiments of the invention provide better results because the point of incidence does not change, thereby allowing a smaller sample to be analyzed.

It will be appreciated from the foregoing description that the invention provides an optical system whose output beam is invariant to the rotation of certain plane surfaces of the overall structure. The surface can be a reflective plane grating in which case the invention can be used as the end-reflector of a laser to provide wavelength selection. For such a use, the optical system extracts a portion of the laser power through the zeroth-order of grating reflection in such a way that the extracted beam is spatially invariant to the wavelength selected by rotation of the grating. Alternately, the plane grating can be replaced by a sample surface and the invention used in a wavelength-angle-of-incidence reflectance spectrophotometer assembly. Still further, the plane grating and plane mirror in a common plane may be replaced by a partially transmitting, partially reflecting thin beamsplitter to form an interferometric device or a reflection transmission variable polarizer.

It will be noted that various benefits are achieved by the invention. For example, optical processing is done by mirrors so that the system is useful throughout the entire electromagnetic spectrum. In addition, because the mirrors are either plane or spherical, they are readily available and inexpensive to obtain. Further, variations in the angle of incidence on all of the optical surfaces is achieved by the rotation of an uncomplicated assembly about a single axis. All mirrors and reflecting surfaces of the assembly are either fixed in space or attached to the rotating assembly. Moreover, many embodiments of the invention provide a plane surface that is fixed in space, which is particularly useful in reflectance spectroscopy. Finally, because the angles of incidence and observation can be varied, both specular and diffuse reflectance from the surface can be observed.

What is claimed is:

1. A wavelength selective optical system having a spatially invariant output beam comprising:

a plane diffraction grating, mounted with its rulings perpendicular to the plane of incidence of the input multiple wavelength beam;

a plane mirror, mounted so that its surface lies in the surface plane of said grating;

a rotation means attached to said grating and said plane mirror, so as to rotate said grating and said plane mirror about an axis lying between said grating and said plane mirror, said axis being made coplanar with said surface plane and perpendicular to said plane of incidence; and a spherical mirror mounted so as to reflect a light beam from said grating to said plane mirror, said spherical mirror also being mounted so that its center of curvature lies at the intersection of said rotation axis with said plane of incidence.

2. A wavelength selective optical system as claimed in claim 1 wherein said spherical mirror is fixedly mounted.

3. A wavelength selective optical system as claimed in claim 1 wherein said spherical mirror is attached to said rotation means so as to rotate as said first and second plane surfaces rotate.

4. A wavelength selective optical system having a spatially invariant output beam comprising:

a plane diffraction grating fixedly mounted;

first and second plane mirrors mounted on either side of said plane diffraction grating at different angles with respect thereto so that a common axis passes through said first and second plane mirrors and said plane diffraction grating, said first and second plane mirrors being rotatable with respect to said plane grating;

first and second spherical mirrors, said first spherical mirror mounted so as to reflect a light beam from said first plane mirror to said plane diffraction grating and said second spherical mirror mounted so as to reflect a light beam from said plane diffraction grating to said second plane mirror, the center of curvatures of said first and second spherical mirrors lying along said axis; and, rotation means attached to said first and second plane mirrors for rotating said first and second plane mirrors about said axis.

5. An optical system suitable for use in reflectance spectroscopy having a spatially invariant output beam comprising:

a sample surface mounted so as to intersect a light beam and reflect it;

a plane reflector mounted so as to receive the beam reflected by said sample surface and reflect it, said sample surfaces and said plane reflector mounted in planes that when extended intersect along a predetermined axis; and, rotation means attached to said sample surface and said plane reflector for rotating said sample surface and said plane reflector about said axis.

6. An optical system as claimed in claim 5 wherein the plane of incidence of the light beam that intersects said sample surface and is reflected to said plane reflector is at right angles to said axis.

7. An optical system as claimed in claim 6 wherein said sample surface and said plane reflector lie in a common plane and including a spherical mirror mounted so as to reflect said light beam from said sample surface to said plane reflector, the center of curvature of said spherical mirror being coincident with the point of intersection of said axis and the plane of incidence of said light beam.

8. An optical system as claimed in claim 7 wherein said spherical mirror is fixedly mounted.

9. An optical system as claimed in claim 7 wherein said spherical mirror is attached to said rotation means so as to rotate as said sample surface and said reflector rotate.

10. An interferometer having a spatially invariant output beam comprising:

a thin, partially transmitting, partially reflecting beamsplitter, a first spherical reflector mounted on one side of said beamsplitter having a center of curvature that lies on an axis passing through said beamsplitter;

a second spherical reflector mounted on the other side of said beamsplitter in the mirror position of said first spherical reflector, said second spherical mirror having a center of curvature that lies on the same point of said axis; and, rotation means connected to said beamsplitter for rotating said beamsplitter about said axis.

11. A wavelength selective optical system having a spatially invariant output beam comprising:

a plane reflective diffraction grating mounted with its rulings perpendicular to the plane of incidence defined by an input multiple wavelength beam and the normal to the grating;

a plane mirror mounted so as to receive the beam reflected by said grating and reflect it, said plane mirror and said grating intersecting in an axis parallel to said grating rulings and perpendicular to said plane of incidence, the angle of intersection between said plane mirror and said grating and said plane mirror being fixed at any value greater than 0° and less than 180°; and rotation means attached to said grating and to said plane mirror for rotating said grating and said plane mirror about said axis.

12. An optical system having a spatially invariant output beam comprising:

a planar sample surface;

a plane mirror mounted so that its surface lies in the surface plane of said sample surface;

rotation means attached to said sample surface and said plane mirror, so as to rotate said sample surface and said plane mirror about an axis lying between said plane mirror about an axis lying between said sample surface and said plane mirror, said axis being made coplanar with said surface plane and perpendicular to the plane of incidence of the input beam; and a spherical mirror mounted so as to reflect a light beam from said sample surface to said plane mirror, said spherical mirror mounted with its center of curvature at the intersection of said axis with said plane of incidence.

13. An optical system having a spatially invariant output beam comprising:

a planar sample surface fixedly mounted;

a first plane mirror mounted so that its surface lies in the plane of said sample surface;

second and third plane mirrors mounted so that said sample surface and first plane mirror lie between said second and third plane mirrors, said second and third plane mirrors lying in a second common plane, so that the intersection of said surface plane and said second plane lies in the sample surface and all three plane mirrors;

rotation means attached to said second and third plane mirrors, so as to rotate said second and third plane mirrors about said intersection; and three spherical mirrors mounted with their respective centers of curvature along said intersection, the first center lying between said second plane mirror and said sample surface, the second center lying between said sample surface and said first plane mirror; and the third center lying between said first plane mirror and said third plane mirror, the input beam being successively reflected by said second plane mirror, said first spherical mirror, said sample surface, said second spherical mirror, said first plane mirror, said third spherical mirror, and said third plane mirror.